(12) United States Patent
Hildebrand et al.

(10) Patent No.: US 8,949,182 B2
(45) Date of Patent: Feb. 3, 2015

(54) CONTINUOUS AND ASYNCHRONOUS REPLICATION OF A CONSISTENT DATASET

(75) Inventors: Dean Hildebrand, San Jose, CA (US); Aameek Singh, San Jose, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/162,615

(22) Filed: Jun. 17, 2011

(65) Prior Publication Data

US 2012/0323850 A1 Dec. 20, 2012

(51) Int. Cl.
G06F 17/30 (2006.01)
(52) U.S. Cl.
CPC ................................ *G06F 17/30578* (2013.01)
USPC .......................................... 707/624; 707/613
(58) Field of Classification Search
USPC .................. 707/610–613, 624, 625
See application file for complete search history.

(56) References Cited

U.S. PATENT DOCUMENTS

| 5,133,065 | A | * | 7/1992 | Cheffetz et al. .................... 714/2 |
| 5,657,440 | A | * | 8/1997 | Micka et al. ..................... 714/16 |
| 7,464,238 | B1 | * | 12/2008 | Yadav ........................... 711/162 |
| 7,467,167 | B2 | | 12/2008 | Patterson | |
| 7,475,098 | B2 | | 1/2009 | Patterson et al. | |
| 7,529,782 | B2 | | 5/2009 | Prahlad et al. | |
| 7,603,391 | B1 | | 10/2009 | Federwisch et al. | |
| 7,617,262 | B2 | | 11/2009 | Prahlad et al. | |
| 7,747,830 | B2 | | 6/2010 | Arakawa et al. | |
| 7,984,085 | B1 | * | 7/2011 | Aggarwal et al. ............. 707/825 |
| 8,037,023 | B2 | * | 10/2011 | Liu et al. ....................... 707/613 |
| 8,037,345 | B1 | * | 10/2011 | Iyer et al. ..................... 714/6.12 |
| 8,180,728 | B2 | * | 5/2012 | Jackson ....................... 707/610 |
| 8,239,344 | B2 | * | 8/2012 | Hirakawa et al. ............. 707/613 |
| 8,255,359 | B2 | * | 8/2012 | Quinlan et al. ............... 707/613 |
| 8,539,197 | B1 | * | 9/2013 | Marshall et al. ............. 711/173 |
| 2002/0019844 | A1 | * | 2/2002 | Kurowski et al. ............ 709/201 |
| 2005/0065986 | A1 | * | 3/2005 | Bixby et al. .................. 707/204 |
| 2005/0262097 | A1 | | 11/2005 | Sim-Tang et al. | |
| 2007/0055835 | A1 | | 3/2007 | Malkin et al. | |
| 2010/0131466 | A1 | * | 5/2010 | Chen ............................ 707/615 |
| 2010/0179941 | A1 | | 7/2010 | Agrawal et al. | |
| 2010/0205392 | A1 | | 8/2010 | Schnapp et al. | |
| 2012/0023066 | A1 | * | 1/2012 | Bourbonnais et al. ......... 707/613 |
| 2012/0233418 | A1 | * | 9/2012 | Barton et al. ................ 711/162 |
| 2012/0233463 | A1 | * | 9/2012 | Holt et al. .................... 713/168 |
| 2013/0006934 | A1 | * | 1/2013 | Inturi et al. ................... 707/634 |
| 2013/0061084 | A1 | * | 3/2013 | Barton et al. ................ 713/400 |

* cited by examiner

*Primary Examiner* — Leslie Wong
(74) *Attorney, Agent, or Firm* — Lieberman & Brandsdorfer, LLC

(57) ABSTRACT

Embodiments of the invention relate to creating and maintaining consistent data sets in a shared pool of configurable computer resources to support disaster recovery support. Data from an application is stored in local data storage and replicated to another data storage. A consistency point of the data is created in both of the data storage, with the consistency point representing an identical data set at a point-in-time. Based upon the created consistency points, a consistent set of application data may be requested to support a read operation for a migrated application.

12 Claims, 7 Drawing Sheets

CONTINUOUS AND ASYNCHRONOUS REPLICATION OF A CONSISTENT DATASET

BACKGROUND

This invention relates to application migration in a shared pool of configurable computing resources. More specifically, the invention relates to creation of a consistent dataset in two storage subsystems to support the application migration.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations. Several factors drive the decision to launch an application in a specific data center, including resource availability, user location, disaster awareness, data location, and available facilities. However, the prior art cloud computing configurations do not provide flexible data migration with respect to the application location.

BRIEF SUMMARY

This invention comprises a system, and article for creation of consistent data within an on-demand network accessible environment with a shared pool of configurable computing resources.

In one aspect, a computer program product is delivered as a service through a network connection. The computer program product comprises a computer readable storage medium having computer readable program code embodied therewith. Computer readable program code is provided for use with data storage to maintain and manage consistency of data within a shared pool of resources. More specifically, computer readable program code is provided to support a write operation and to store write data associated with the write operation in a first data storage within the shared pool. Computer readable program code is provided to track file system data and metadata changes in the first data storage with respect to the write data, and to asynchronously track changes to the data and metadata to a second data storage within the pool and in communication with the first data storage. In addition, computer readable program code is provided to create first and second consistency points associated with the write data. More specifically, a first consistency point is created in the first data storage, with the first consistency point representing file system data and metadata at a first point in time. The second consistency point is created in the second data storage, with the second consistency point representing the same file system data and metadata as the first consistency point.

In a further aspect, a system is provided with a first data site having a processor in communication with storage media. A functional unit is provided in communication with the processor. The functional unit includes tools to support creation and management of consistent data to support application migration. More specifically, the functional unit includes a write manager, a track manager, a synchronization manager, and a consistency manager. The write manager addresses a write operation wherein an application writes data and stores the write data in the storage media. The track manager, which is in communication with the write manager, tracks file system data and metadata changes in the first data site. The synchronization manager, which is in communication with the track manager, asynchronously synchronizes the tracked data and metadata changes to a second data site. Finally, the consistency manager, which is in communication with the synchronization manager, supports synchronization of data in the first and second data sites. More specifically, the consistency manager creates a first consistency point in the first data site, with the first consistency point representing file system data and metadata at a first point in time. The consistency manager also creates a second consistency point in the second data site, with the second consistency point representing the same file system data and metadata as the first consistency point.

In an even further aspect, a service is provided for creation of consistent data in a shared pool of configurable resources. An application performs a write operation in which the application writes and stores write data in a first data site in the shared pool. As the application writes the data, file system data and metadata changes in the first data site are tracked and the tracked changes are asynchronously synchronized to a second data site in the shared pool. This synchronization provides a copy of the write data at a second location. To ensure consistency of the data at the first and second data sites, a first consistency point representing the file system data and metadata is taken at a first point in time, including quiescing the file system and suspending processing of data and metadata in the first data site. In addition, a second consistency point is created in the second data site, with the second consistency point representing the same file system data and metadata as the first consistency point. The process of creating the second consistency point also includes quiescing the second file system and suspending processing of data and metadata in the second data site.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
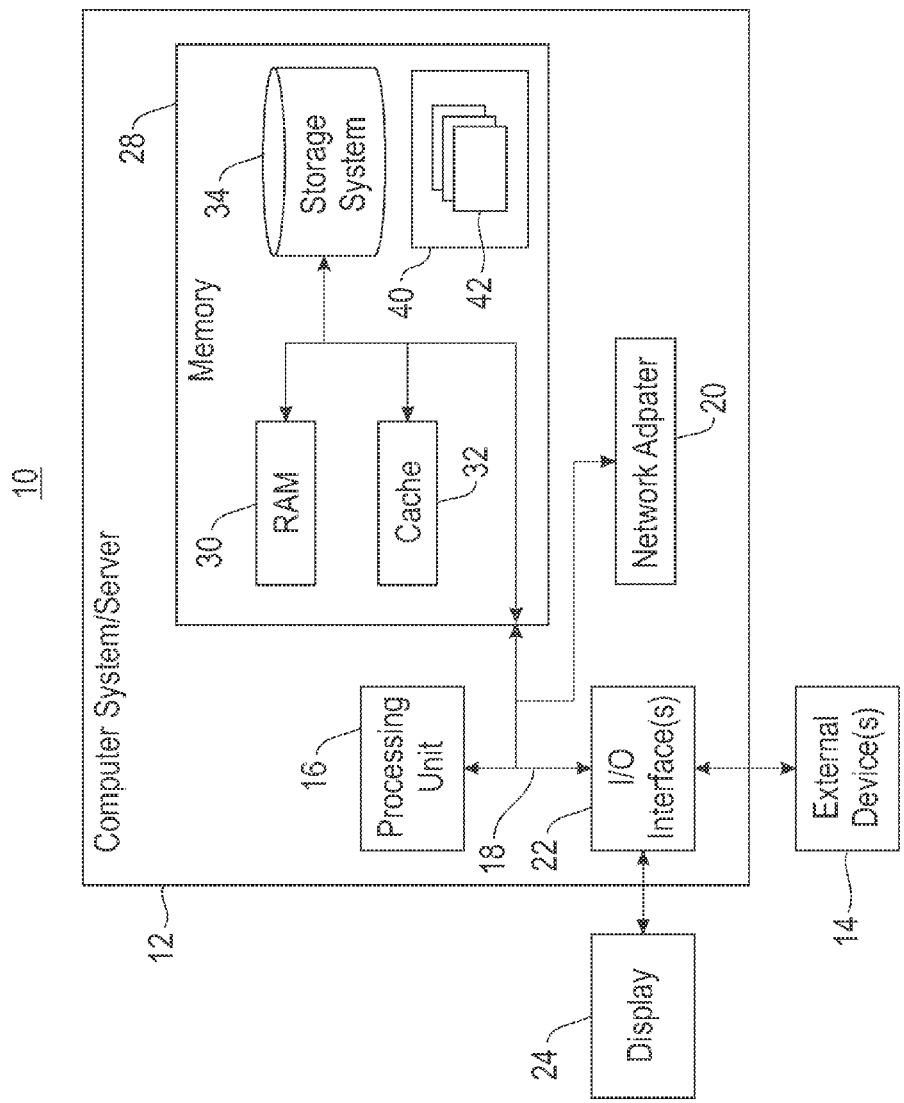
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
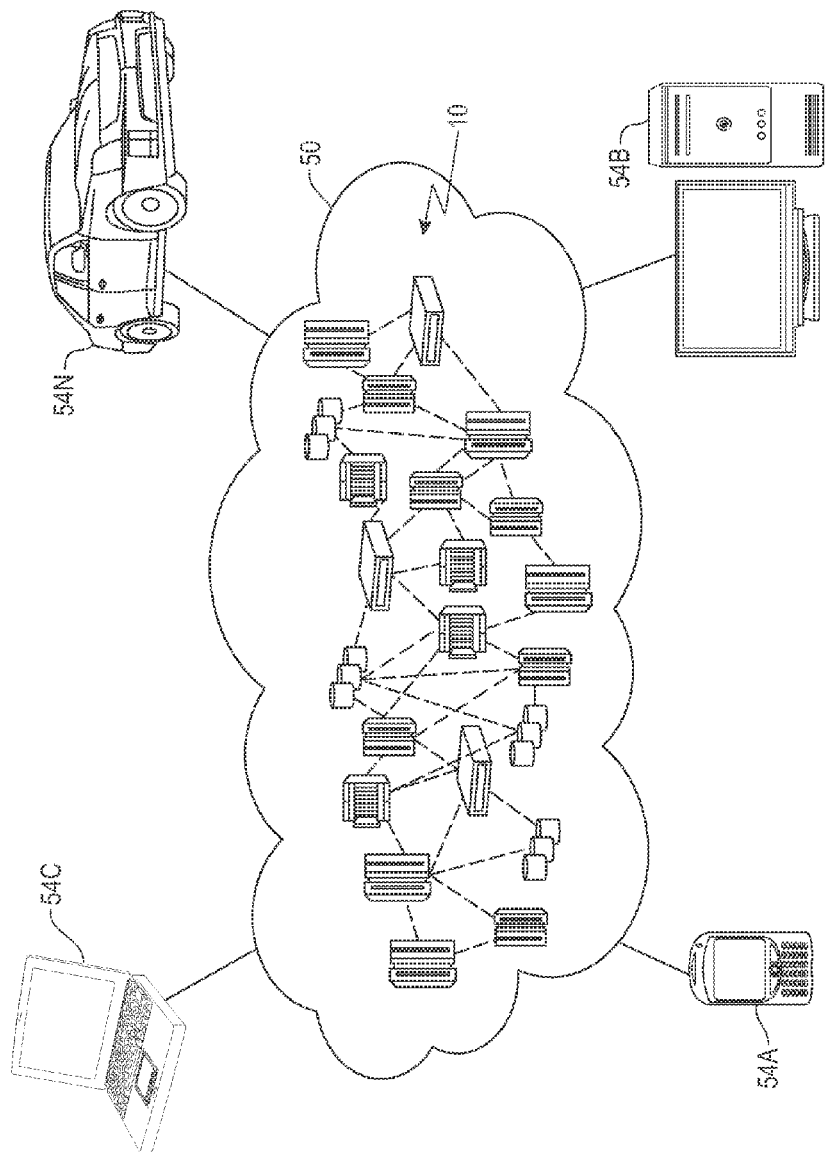
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
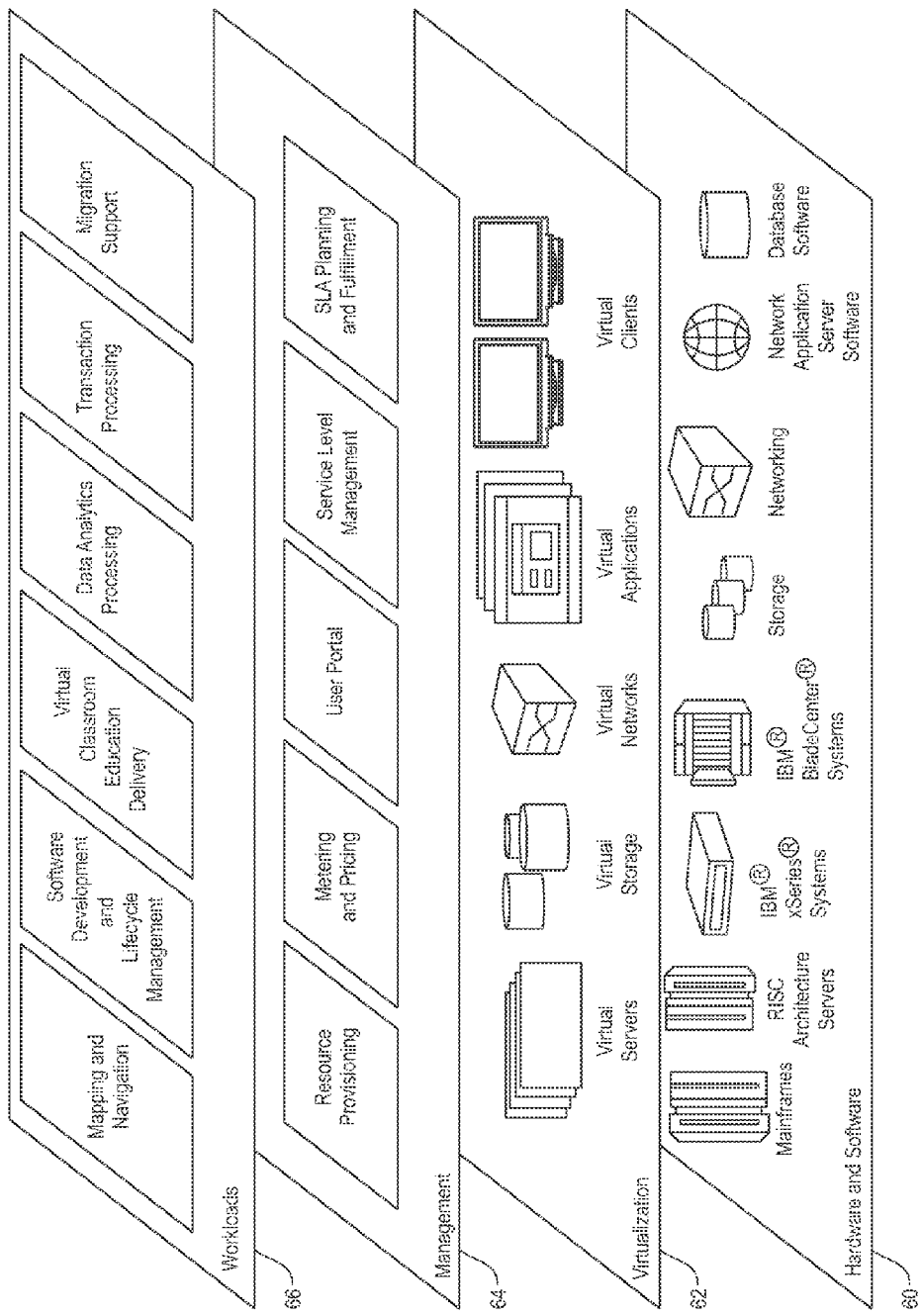
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and creation and maintenance of consistent application data to support migration within the cloud computing environment.

In the shared pool of configurable computer resources described herein, hereinafter referred to as a cloud computing environment, applications may migrate to any data center, also referred to herein as a data site. There are two general scenarios in which an application is subject to migration, including a planned migration and an unplanned migration. In a planned migration, the application migrates to any data center in the cloud while maintaining disaster recovery support, and in an unplanned migration, the application is subject to failure and recovers in any data center in the cloud while maintaining disaster recovery support. Accordingly, the difference between a planned migration and an unplanned migration is the failure and subsequent recovery of a failed application.

It is known that the current cloud computing models are not flexible with respect to disaster recovery. More specifically, it is known in the art that a failed application with associated supporting data must recover in a designated recovery center. The current models do not enable recovery at a location with consistent data in an efficient manner. Accordingly, an efficient recovery based on consistent data at the recovery center would enhance application recovery.

Figure 4:
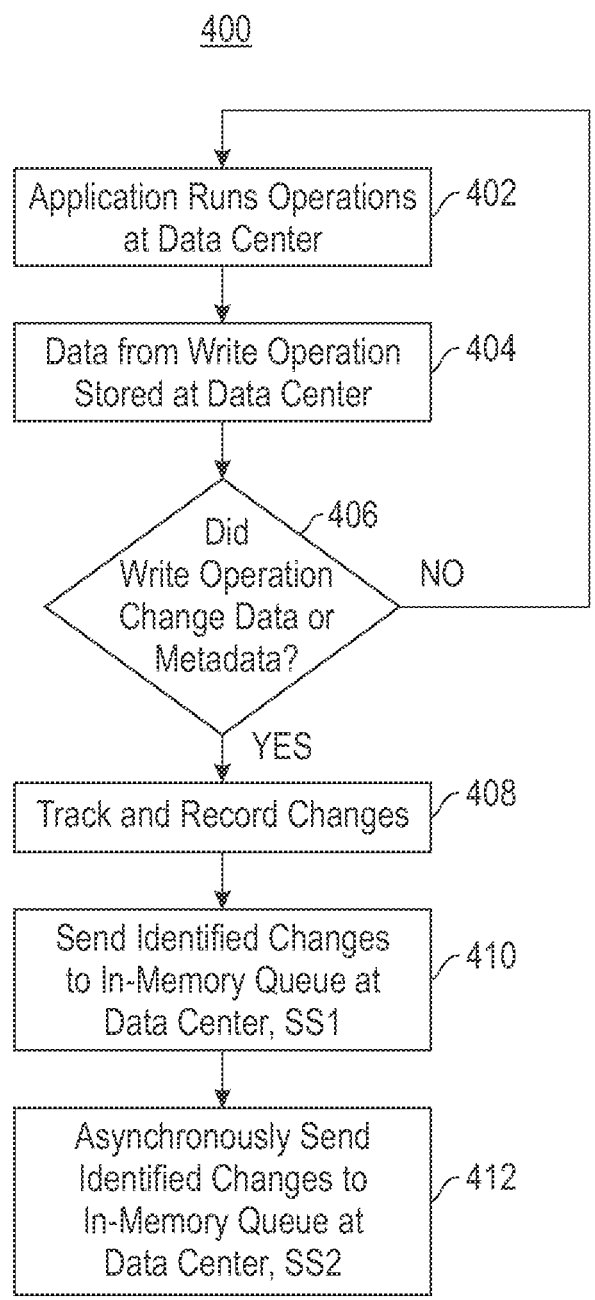
FIG. 4 depicts a flow chart illustrating steps employed for executing a write operation to support creation of a backup copy at a remote data center in a shared pool of configurable computer resources.

Regardless of the planned or unplanned form of migration, both categories of migration require a minimum amount of 'critical' data to be transferred and cached to support application execution. All other 'non-critical' data is asynchronously cached in the background so as not to interfere with running applications. FIG. 4 is a flow chart (400) illustrating steps employed for executing a write operation and storage of write data in the shared pool of configurable computer resources, hereinafter referred to as a cloud. Specifically, an application runs at a data center in the cloud (402). The application may support read and/or write operations. Data generated from a write operation is stored in data storage local to the data center in which the application is processing, e.g. local storage, also referred to herein as a first data storage subsystem (404). For each write operation, it is determined if the write operation causes a change in either the data or metadata (406). A negative response to the determination at step (406) is followed by continued support of read and write operations at step (402). Conversely, a positive response to the determination at step (406) is following by employing a tool to track and record the changes to the data or metadata (408). More specifically, at step (408) data created from the write operation is tracked to identify changes in data and/or metadata. Accordingly, for each write operation that result in a data or metadata change, such changes are tracked.

Different tools may be employed to address tracking of data and/or metadata changes associated with a write operation. In one embodiment, an in-memory message queue is employed to track such changes. More specifically, a first in-memory message queue is associated with the first data storage subsystem, and a second in-memory message queue is associated with a second data storage subsystem, which stores a replica of data from the first storage subsystem. Following step (408) data or metadata changes are sent to the in-memory message queue in the first storage subsystem (410). To ensure that the change is reflected in the second data storage subsystem, the identified data or metadata change is asynchronously sent to the second in-memory message queue in the second storage subsystem (412). Accordingly, changes in data and/or metadata from a write operation are sent from the first storage subsystem to the second storage subsystem.

Replicating the tracked changes is one part in creating a second copy of the data at a second site. However, there is a latency associated with the data replication. More specifically, in the event of failure of one of the sites, i.e. the first or second data storage subsystem, the data at both locations needs to be reconciled so that a backup application processes from the same data set at either location. To account for the latency, consistency points of the data stored in both the first and second data storage subsystems are created to ensure that at a certain point in time the data in both file systems are equivalent. Accordingly, in the case of failure of either one of the file systems, the other file system may revert to the most recent consistency point and continue operations.

Figure 5:
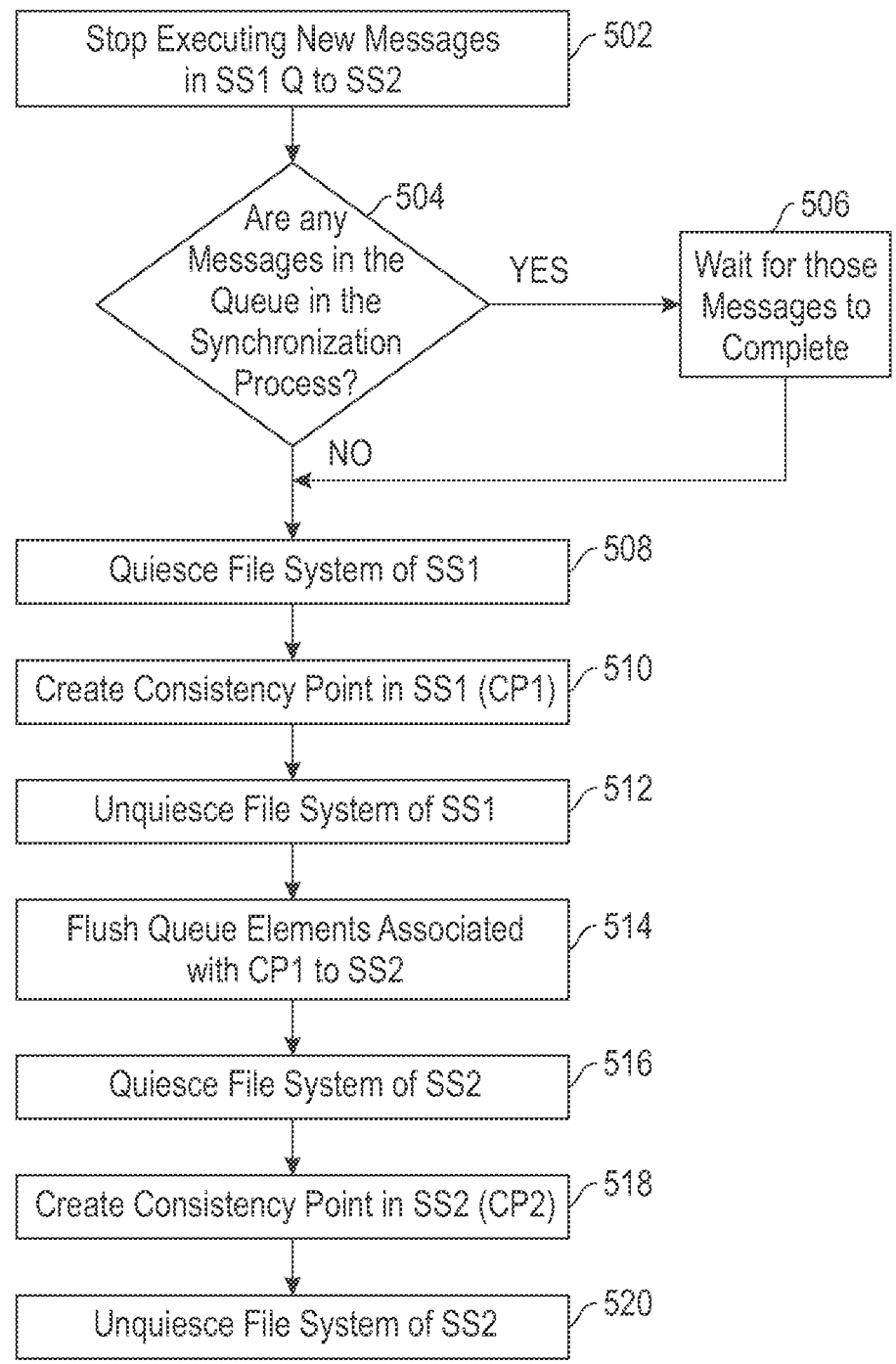
FIG. 5 depicts a flow chart illustrating creation of consistency points in both the first and second file systems, with both consistency points representing the same data.

FIG. 5 is a flow chart (500) illustrating the steps employed to support creation of consistency points in both the first and second file systems associated with the first and second sites, respectively, with both consistency points representing the same data. Before creation of a first consistency point in the first data storage subsystem, the first storage subsystem stops executing new messages in the queue (502). All outstanding messages in the queue that are in the process of synchronization to a data site must be completed before creation of a consistency point. In one embodiment, items that are in the queue but not in the process of synchronization may be associated with the consistency point. Following step (502) it is determined if there are messages in the queue that are in the synchronization process (504). A positive response to the determination at step (504) is following by completion of the messages that are in the process of synchronization (506). Following either a negative response to the determination at step (504) or completion of the synchronization at step (506) the first file system is quiesced (508), which includes suspending processing of data and metadata in the first queue, and a first consistency point is created in the first storage subsystem (510). Items that are in the queue but not in the process of synchronization may be associated with the first consistency point. The process of creating the consistency point at step (510) includes associating all changes of data and metadata with the first storage subsystem. Once the first consistency point is created, the first file system is unquiesced (512). At the same time, once the file system is unquiesced new messages can be received. Accordingly, the creation of the consistency point quiesces the file system and associates all data from the write operation(s) and data in the queue with the created consistency point.

The creation of the first consistency point is local to the first storage subsystem. However, in order to create a second consistency point local to the second storage subsystem that is equivalent to the first consistency point, the data from the write operation and associated with the first consistency point must be flushed to the second storage subsystem. Following step (512), data from the in-memory queue that is associated with the first consistency point of the first file system is flushed to the second file system (514), where in one embodiment the data is received in an in-memory queue local to the second storage subsystem. Once all data in the second queue that is associated with the first consistency point is in the second storage subsystem, a second consistency point is created in the second file system. More specifically, the process of creating the second consistency point includes quiescing the second file system (516) and creating a second consistency point in the second storage subsystem (518). As noted above, quiescing the file system includes suspending processing of data and metadata. Once the second consistency point is created, the second file system is unquiesced (520). Accordingly, the process of creating the second consistency point includes associating all data and metadata of the first consistency point with the second consistency point so that the first and second consistency points and the associated data are equivalent.

The process of creation of consistency points within the two separate file system supports continuous data replication at the file level. As shown in FIGS. 4 and 5, changes to data created in response to one or more write operations are tracked and synchronized from the first data storage system to the second data storage system. The continuous replication of data across the storage system occurs in an asynchronous manner. In addition, the continuous replication reduces the failure window between when a consistent data set is created in the first data storage system and when it is fully replicated to the second data storage system, thereby decreasing the amount of potential data loss in the event of failure of the first storage system.

As shown in FIG. 5, the first consistency point of the first data storage system may be created after data in the queue has been flushed into the data storage subsystem. However, in one embodiment, the creation of the first consistency point is undertaken on a periodic basis, followed by creation of the second consistency point on the second storage subsystem. More specifically, a set of instructions may establish the frequency in which consistency points are created. The frequency ensures that on a periodic basis there will be a consistent set of data replicated across the first storage subsystems. In one embodiment, the frequency is based upon creation of a consistency point in the primary storage subsystem. For example, the consistency point is created on the first storage subsystem on the set frequency, while the second consistency point is created in the second storage subsystem when replication of data to support the equivalence of the first consistency point with the soon to be taken consistency point is complete. Because the second consistency point is created following completion of the replication, a window between creation of the first and second consistency points is narrow. More specifically, the second consistency point is created following replication and is not subject to a set frequency between creation of the first consistency point in the first storage subsystem and creation of the second consistency point in the second storage subsystem. Accordingly, by establishing a set frequency for creation of consistency points in the first storage subsystem, a window between the creation of the first consistency point and the creation of the second consistency point is relatively narrow.

Migration of an application across storage subsystems may be planned or unplanned. Creation of the consistency points in the first and second storage subsystems ensures that should an application in one of the storage subsystem be subject to a failure, the application can recover from a consistent data set. By creation of two identical consistency points in two different storage subsystems, a failure associated with the first consistency point enables recovery based upon the second consistency point. In one embodiment, the creation of the consistency point described herein is known as a snapshot, with the recovery from a consistency point referred to as restoring a previous snapshot of the data set. Accordingly, data and metadata from one or more write operations are stored in local data storage, i.e. a first storage subsystem, and replicated to backup data storage, i.e. a second storage subsystem, with creation of one or more consistency points in both data storage locations.

Figure 6:
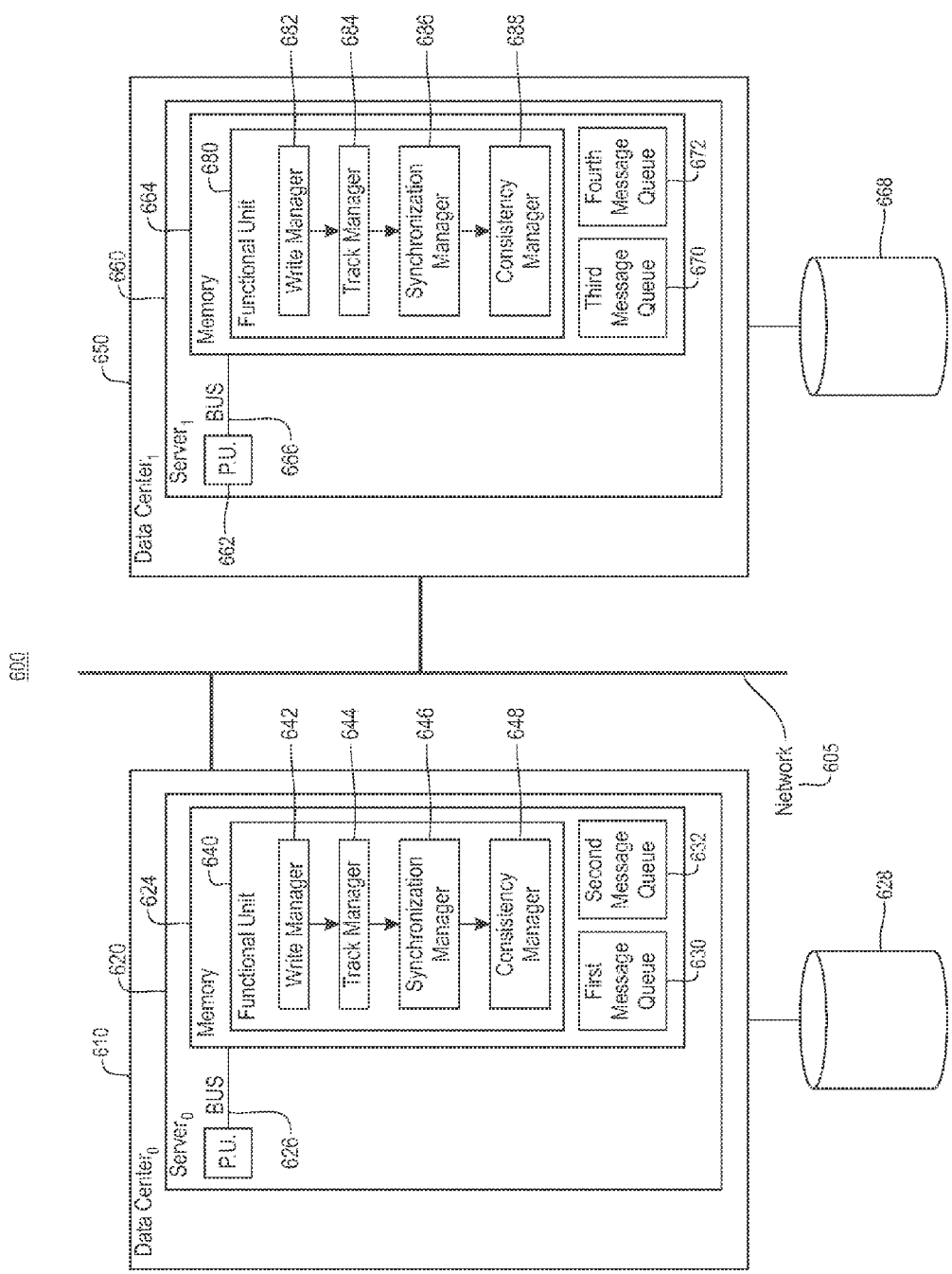
FIG. 6 depicts a block diagram illustrating tools embedded in a computer system to support both creation of a backup copy of data in a shared pool of configurable resources, including creating consistency points in two different file systems.

As demonstrated in the flow charts of FIGS. 4 and 5, a method is employed to support creation of first and second consistency points in both first and second storage subsystems, respectively, with the first and second consistency points referencing an identical data set. If an application referencing the data is subject to migration, either planned or unplanned, disaster recovery is supported through the consistency points on two or more storage subsystems. In one embodiment, following the conclusion of either a planned migration or unplanned migration, application processing continues with data replication and creation of consistency points in at least two storage subsystems, i.e. data sites. FIG. 6 is a block diagram (600) illustrating tools embedded in a computer system to support creation of identical consistency points in at least two storage subsystems. More specifically, a shared pool of configurable computer resources is shown with a first data site (610) and a second data site (650). Although two data centers are shown in the example herein, the invention should not be limited to the quantity of data site illustrated herein. In one embodiment, the first data site supports a first data storage system and the second data site supports a second data storage system. Accordingly, two or more data sites may be employed to support dynamic application migration.

Each of the data sites in the system is provided with at least one server in communication with data storage. More specifically, the first data site (610) is provided with a server (620) having a processing unit (622), in communication with memory (624) across a bus (626), and in communication with first local storage (628), and the second data site (650) is provided with a server (660) having a processing unit (662), in communication with memory (664) across a bus (666), and in communication with second local storage (668). The first and second data sites (610) and (650), respectively, communicate over a network (605).

In the example shown herein, a first functional unit (640) is provided local to the server (620) to process read and write operations local to the first data site (610). Data from write operations are written to the first local storage (628), and replicated to the second local storage (668). In one embodiment, the replication to the second local storage (668) is limited to non-duplicate data.

Both the first and second data sites (610) and (650), respectively, each have tools to support and maintain creation of consistency points within the data local to the first and second data sites (610) and (650), respectively, such that the consistency points reference the same data. The first functional unit (640) is provided with several tools to support creation of the first consistency point in the first data center (610). The tools include, but are not limited to, a write manager (642), a track manager (644), a synchronization manager (646), and a consistency manager (648). The write manager (642) is provided to write data and to store the data in first local storage (628). It is known in the art that a write operation may cause a change to a state of the data from before the write operation. As such, a track manager (644) is provided in communication with the write manager. The track manager (644) is provided to track file system changes associated with the first data (610), including changes to both data and metadata resulting from the write operation. To maintain consistency of data between the data centers, data from the first data center (610) is communicated to the second data center (650). A synchronization manager (646), in communication with the track manager (644), is provided to synchronize the tracked data and metadata changes from the first data center (610) to the second data center (650). In one embodiment, the synchronization manager (646) synchronizes the data between the data centers in either a synchronous or asynchronous manner. Accordingly, in response to a write operation that causes a change in data and/or metadata, changes are tracked and synchronized across the data centers.

To ensure that the data in both the first and second data sites are consistent; a consistency manager (648) is provided in communication with the synchronization manager (646). The consistency manager (648) is responsible for creation of one or more consistency points of the application data in the first local storage (628). To create a consistency point in the first data site (610), the consistency manager (648) quiesces the local file system and suspends process of data and metadata. In one embodiment, a message queue is provided to communicate data and metadata changes across the data sites (610) and (650). As shown herein, a first and second message queues (630) and (632), respectively, are both provided local to the first data site (610), and a third and fourth message queue (670) and (672), respectively, are both provided local to the second data site (650). Changes to data and metadata by the write manager (642) are placed in message queue (630) and communicated to message queue (670) by the synchronization manager (646). With respect to creation of the consistency point in the file system, the consistency manager (648) suspends processing of data and metadata in the first queue (630) prior to creation of the first consistency point, and associates all data and metadata chances in the first queue (630) with the first consistency point. In one embodiment, the consistency manager (648) flushes all of the messages in the first queue (630) to the third queue (670) prior to creation of the first consistency point.

As shown in FIG. 6, a second functional unit (680) is provided with several tools to support creation of a second consistency point in the second data site (650), with the second consistency point representing identical file system data and metadata as the first consistency point in the first data site (610). The tools include, but are not limited to, a write manager (682), a track manager (684), a synchronization manager (686), and a consistency manager (688), with these managers supporting parallel functionality as the managers in the first data site (610). The consistency manager (688) is responsible for creation of one or more consistency points of the application data in the second local storage (668). To create a consistency point in the second data site (650), the consistency manager (688) quiesces the local file system and suspends processing of data and metadata in the third queue (670) prior to creation of the second consistency point, and associates all data and metadata changes in the third queue (670) with the second consistency point. Accordingly, a parallel set of managers are provided in the second data site (650) to support creation of a second consistency point in the second data site (650) that is identical to the first consistency point in the first data site (610).

Two message queues are shown in each of the data sites. More specifically, queues (630) and (632) are provided in the first data site (610) and queues (670) and (672) are provided in the second data site (650). As described herein, the first data site (610) represents a primary data center with changes in data replicated to the second data site (650) as a backup copy of the file system. Message queue (630) is employed as a send queue, and message queue (670) is employed as a receive queue. In one embodiment, the second data site (650) may function as a primary data center with a backup copy of the second file system retained local to the first data site (610). In this embodiment, message queue (672) is employed as a send queue, and message queue (632) is employed as a received queue. Accordingly, the second data site (650) may function as either a backup data site, or both a primary and a backup data site.

Consistent data replication is supported by the write, track, synchronization and consistency managers (642), (644), (646), and (648) of the first data site (610) and the write, track, synchronization and consistency manager (682), (684), (686), and (688) of the second data site (650). In one embodiment, the managers are provided in the shared pool of configurable computer resources, i.e. cloud, to restore a processing element from a saved consistency point prior to execution of the processing element. The write, track, synchronization, and consistency managers (642), (644), (646), and (648) of the first data site (610) are shown residing in memory (624) of the server (620) local to the first data center (610), and the write, track, synchronization, and consistency managers (682), (684), (686), and (688) of the second data site (650) are shown residing in memory (664) of the server (660) local to the second data site (650). Although in one embodiment, the managers may reside as hardware tools external to memory (624) and (664), respectively, they may also be implemented as a combination of hardware and software. Similarly, in one embodiment, the managers may be combined into a single functional item that incorporates the functionality of the separate items. As shown herein, each of the manager(s) is shown local to one data site. However, in one embodiment they may be collectively or individually distributed across a shared pool of configurable computer resources and function as a unit to manage creation of identical consistency points in two different file systems. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
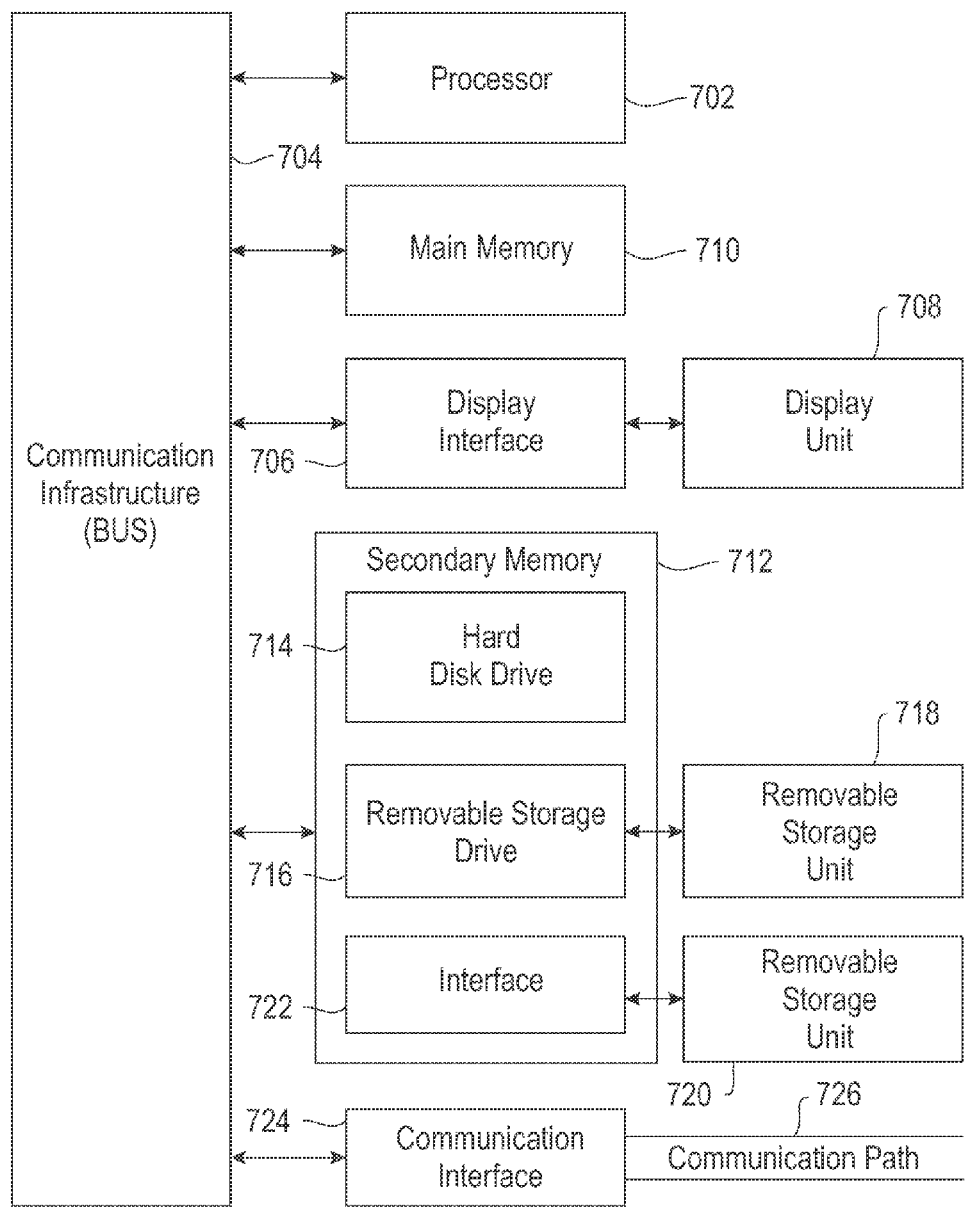
FIG. 7 depicts a block diagram showing a system for implementing an embodiment of the present invention.

Referring now to FIG. 7 is a block diagram (700) showing a system for implementing an embodiment of the present invention. The computer system includes one or more processors, such as a processor (702). The processor (702) is connected to a communication infrastructure (704) (e.g., a communications bus, cross-over bar, or network). The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

We claim:

1. A computer program product for use with a data storage subsystem, the computer program product comprising a computer readable storage medium having computer readable program code embodied thereon, which when executed causes a computer to implement the method comprising:
   writing data and storing associated write data in a first data storage local to a first data site;
   identifying file system data and metadata changes associated with the write operation, in the first data storage;
   tracking an recording data and metadata consisting of the identified changes;
   asynchronously synchronizing the tracked file system data and metadata changes to a second data storage in communication with the first data storage, wherein the second data storage is local to a second data site with a shared pool of resources separate from the first data site;
   creating a first consistency point in the first file system associated with the first data storage, the first consistency point representing file system data and metadata at a first point in time, including quiescing a first file system in communication with the first data storage and suspending processing of data and metadata in the message queue local to the first data storage prior to creation of the first consistency point; and
   creating a second consistency point in the second file system associated with the second data storage, wherein the creation of consistency points within the two separate file systems supports continuous data replication.

2. The computer program product of claim 1, further comprising employing one or more message queues to communicate data and metadata changes to the second data storage.

3. The computer program product of claim 2, wherein creating the first consistency point includes associating all outstanding data and metadata changes in a message queue local to the first data storage with the first consistency point prior to creation of the second consistency point.

4. The computer program product of claim 2, wherein creating the second consistency point includes all outstanding data and metadata changes in the message queue local to the first data storage received and stored in the second data storage prior to creation of the second consistency point.

5. A computer system comprising:
   a first data site including a processor in communication with storage media;
   a functional unit in communication with processor, the functional unit comprising:
      a write manager to write data from at least one write operation and store associated write data in a first data storage local to a first data site;
      a track manager to identify file system data and metadata changes associated with the write operation, in the first data storage, and to track and record data and metadata consisting of the identified changes; and
      a synchronization manager to asynchronously synchronize the tracked data and metadata changes to a second data storage in communication with the first data storage, wherein the second data storage is in communication with a second data site having a shared pool of resources, and the second data site is separate from a first data site in communication with the first data storage;
      a consistency manager to support synchronization of data in the first data storage and the second data storage, the consistency manager to:
         create a first consistency point in the first data storage, the first consistency point representing file system data and metadata at a first point-in-time, quiesce a first file system in communication with the first data storage and suspends processing of data and metadata in a first message queue local to the first data storage prior to creation of the first consistency point; and
         create a second consistency point in the second data storage, wherein the creation of consistency points within the two separate file systems enables continuous data replication.

6. The computer system of claim 5, further comprising one or more message queues to communicate data and metadata changes to the second data storage.

7. The computer system of claim 6, wherein the consistency manager associates all outstanding data and metadata changes in a message queue local to the first data storage with the first consistency point prior to creation of the second consistency point.

8. The computer system of claim 6, wherein the second consistency point created by consistency manager includes all outstanding data and metadata changes in the message queue local to the first data storage received and stored in the second data storage prior to creation of the second consistency point.

9. A service to support maintenance of consistent data sets comprising:
   writing data from at least one write operation and storing associated write data in a first data storage;
   identifying file system data and metadata changes associated with the write operation, in the first data storage;
   tracking and recording data and metadata consisting of the identified changes;
   asynchronously synchronizing the tracked data and metadata changes to a second data storage in communication with the first data storage, wherein the second data storage is local to a second data site with a shared pool of resources separate from the first data site;

creating a first consistency point in the first data storage, the first consistency point representing file system data and metadata at a first point in time, including quiescing the file system, and suspending processing of data and metadata in the message queue local to the first data storage prior to creation of the first consistency point; and creating a second consistency in the second data storage, the second consistency point including the replicated write data at the file level, wherein the creation of consistency points within the two separate file systems enables continuous data replication.

10. The service of claim 9, further comprising employing a first message queue local to the first data storage to send data and metadata changes to the second data storage, and a second message queue local to the second data storage to receive the changes.

11. The service of claim 10, further comprising scheduling creation of the first and second consistency points, including creating the first consistency point at the first data storage based upon a set frequency.

12. The service of claim 11, further comprising creating the second consistency point at the second data storage following completion of replication of data from the first consistency point in the second data storage.

* * * * *